No. 733,466. PATENTED JULY 14, 1903.
H. H. DOW.
PROCESS OF MANUFACTURING BROMIN.
APPLICATION FILED MAY 6, 1903.
NO MODEL.
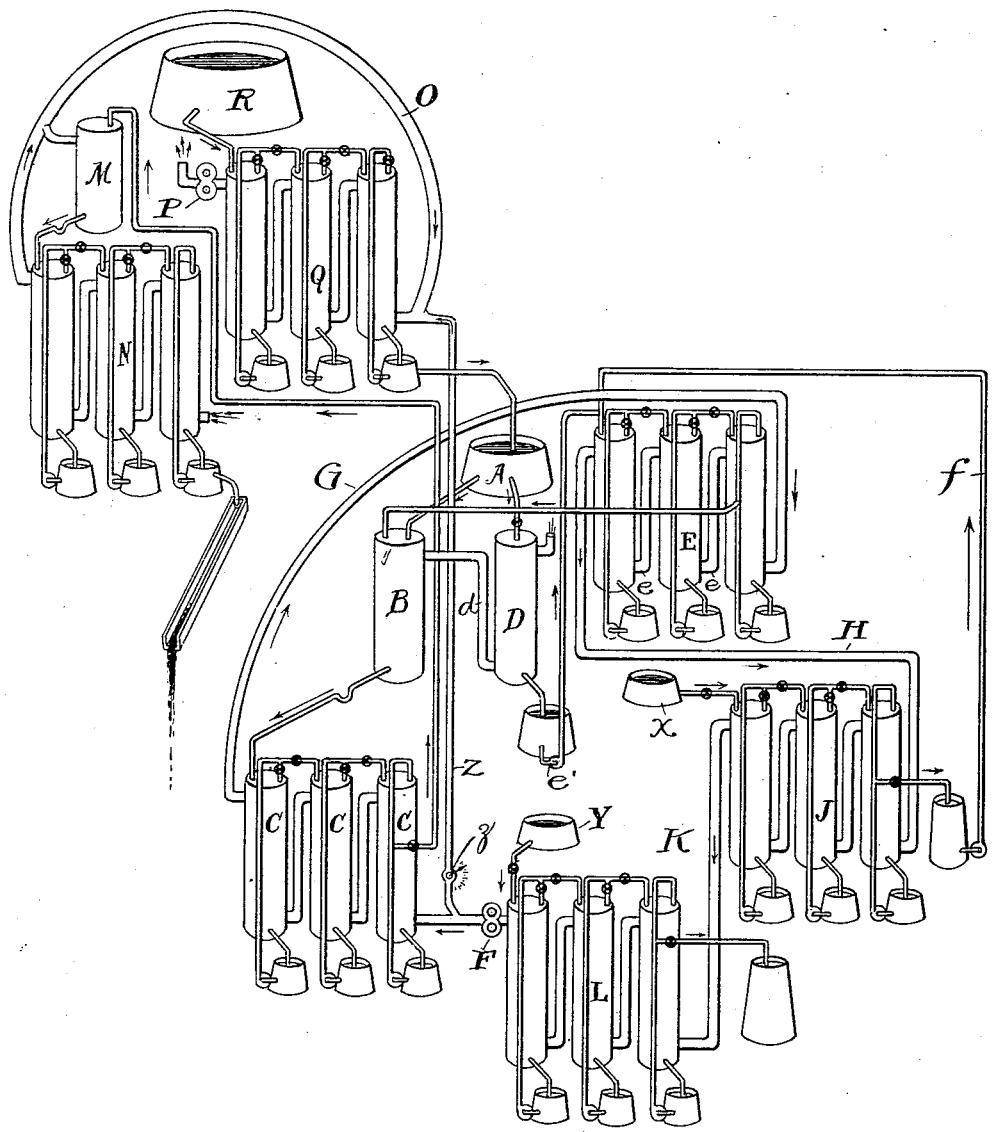
Witnesses.
E. B. Filchrist
G. W. Saywell
Inventor.
Herbert H. Dow
by J. A. Fay
Atty.

No. 733,466. Patented July 14, 1903.

UNITED STATES PATENT OFFICE.

HERBERT H. DOW, OF MIDLAND, MICHIGAN.

PROCESS OF MANUFACTURING BROMIN.

SPECIFICATION forming part of Letters Patent No. 733,466, dated July 14, 1903.

Application filed May 6, 1903. Serial No. 155,796. (No specimens.)

*To all whom it may concern:*

Be it known that I, HERBERT H. DOW, a citizen of the United States, and a resident of Midland, county of Midland, and State of Michigan, have invented a new and useful Improvement in Processes of Manufacturing Bromin, of which the following is a specification, the principle of the invention being herein explained and the best mode in which I have contemplated applying that principle, so as to distinguish it from other inventions.

My invention consists in an improved process for more completely extracting bromin from natural bromid brines and the production of a bromid more nearly free from chlorin.

Said process consists of an improved step hereinafter fully described.

The annexed drawing and the following description set forth in detail one mode of carrying out the invention, such disclosed means constituting but one of various ways in which the principle of the invention may may be used.

In said annexed drawing is represented a diagrammatic view of a form of apparatus used in my improved process.

This invention is an improvement in one of the steps covered in the process of manufacturing bromin by the general process explained and claimed in the United States Letters Patent No. 714,160, issued to me November 25, 1902. The two systems of apparatus and their connection with each other used and described in the process covered by said Letters Patent—viz, the main and auxiliary systems—are shown completely in the accompanying drawing, and inasmuch as their use in this invention is the same as that in the prior invention and form no part of this process for which I claim novelty, with the exception of the improvement to be hereinafter more fully referred to, I shall not describe them more in detail.

Said improvement consists in taking the exhaust liquor from the bromid-purifier J and conveying it through the duct $f$ to the natural-brine purifier E, whereby a close control of the consumption of bromid in J is not required nor a waste of the bromid entailed. In the process shown and claimed in Letters Patent No. 714,160, the bromid contained in the reservoir X must be fed into the tower J in exact accord with the requirements of said tower or otherwise either bromid will go to waste at the overflow or there will not be a sufficient amount to take up all the chlorin. I therefor find it more ecomical of bromid and more reliable in operation if the bromid is always fed to this tower J in excess of the amount actually required to take up all the chlorin. The said excess issues at the overflow and is pumped to the natural-brine purifier, together with the chlorid formed in the towers J, and there mixed with the natural brine. By this means the excess of bromid is not wasted, the amount of bromid allowed to flow into the towers J need not be closely controlled, and a greater amount of purification is accomplished in the tower E.

Other modes of applying the principle of my invention may be employed instead of the one explained, change being made as regards the step herein disclosed, provided the means stated by the following claim or the equivalent of such stated means be employed.

I therefore particularly point out and distinctly claim as my invention—

The improved step in the process of manufacturing bromin from bromid-containing brines which consists in bringing bromin and chlorin laden air into contact with an excess of a solution of an artificial bromid, in which the chlorin is absorbed with the formation of a chlorid, and transferring the excess of bromid and the chlorid to the natural-brine purifier.

Signed by me this 30th day of April, 1903.

HERBERT H. DOW.

Attest:
D. T. DAVIES,
G. W. SAYWELL.